United States Patent
Bahn et al.

(10) Patent No.: US 11,859,047 B2
(45) Date of Patent: Jan. 2, 2024

(54) POLYCARBONATE RESIN COMPOSITION AND ARTICLE INCLUDING THE SAME

(71) Applicant: LG CHEM, LTD., Seoul (KR)

(72) Inventors: Hyong Min Bahn, Daejeon (KR); Un Ko, Daejeon (KR); Jungmoon Bae, Daejeon (KR); Daehyeon Hwang, Daejeon (KR); Mooho Hong, Daejeon (KR); Sugil Yum, Daejeon (KR)

(73) Assignee: LG Chem, Ltd., Seoul (KR)

(*) Notice: Subject to any disclaimer, the term of this patent is extended or adjusted under 35 U.S.C. 154(b) by 249 days.

(21) Appl. No.: 17/266,835

(22) PCT Filed: Nov. 6, 2019

(86) PCT No.: PCT/KR2019/014995
§ 371 (c)(1),
(2) Date: Feb. 8, 2021

(87) PCT Pub. No.: WO2020/096352
PCT Pub. Date: May 14, 2020

(65) Prior Publication Data
US 2021/0371584 A1 Dec. 2, 2021

(30) Foreign Application Priority Data

Nov. 6, 2018 (KR) .................. 10-2018-0135445
Nov. 6, 2018 (KR) .................. 10-2018-0135446
Nov. 5, 2019 (KR) .................. 10-2019-0140503

(51) Int. Cl.
| | |
|---|---|
| C08L 69/00 | (2006.01) |
| C08L 83/04 | (2006.01) |
| C08K 5/42 | (2006.01) |
| C08G 64/06 | (2006.01) |
| B29C 45/00 | (2006.01) |
| C08K 5/00 | (2006.01) |
| C08K 5/1515 | (2006.01) |
| B29K 69/00 | (2006.01) |
| C08G 77/00 | (2006.01) |

(52) U.S. Cl.
CPC .......... *C08G 64/06* (2013.01); *B29C 45/0001* (2013.01); *C08K 5/005* (2013.01); *C08K 5/1515* (2013.01); *C08K 5/42* (2013.01); *C08L 69/00* (2013.01); *C08L 83/04* (2013.01); *B29K 2069/00* (2013.01); *C08G 77/80* (2013.01); *C08L 2201/02* (2013.01); *C08L 2201/08* (2013.01); *C08L 2201/10* (2013.01); *C08L 2203/30* (2013.01); *C08L 2205/02* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 3,775,367 A | 11/1973 | Nouvertne | |
| 6,127,492 A * | 10/2000 | Nagashima | C08K 7/06 528/196 |
| 6,433,050 B1 | 8/2002 | Shinomiya et al. | |
| 7,754,793 B2 | 7/2010 | Chung et al. | |
| 9,287,471 B2 | 3/2016 | de Brouwer et al. | |
| 9,299,898 B2 | 3/2016 | de Brouwer et al. | |
| 9,664,818 B2 | 5/2017 | Kawai | |
| 10,336,901 B2 | 7/2019 | Wen | |
| 2003/0060548 A1 | 3/2003 | Goossens et al. | |
| 2007/0191519 A1 | 8/2007 | Jiao et al. | |
| 2011/0306712 A1 | 12/2011 | Inagaki | |

(Continued)

FOREIGN PATENT DOCUMENTS

| | | |
|---|---|---|
| CN | 102585473 A | 7/2012 |
| CN | 105358613 A | 2/2016 |

(Continued)

OTHER PUBLICATIONS

Gelest Silicone Fluids brochure; (2012) pp. 1-32. (Year: 2012).*

*Primary Examiner* — David J Buttner
(74) *Attorney, Agent, or Firm* — Bryan Cave Leighton Paisner LLP

(57) ABSTRACT

Provided is a polycarbonate resin composition and a molded product comprising same. The polycarbonate resin composition comprises a linear polycarbonate resin, a branched polycarbonate resin, a fluorinated sulfonate-based metal salt, a phenyl methyl silicone oil, and a phenyl methyl silicone resin. The linear polycarbonate resin and branched polycarbonate resin include a repeating unit of the following Chemical Formula 1:

Chemical Formula 1

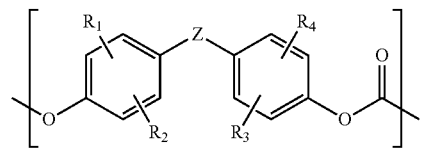

wherein in Chemical Formula 1:

$R_1$ to $R_4$ are each independently hydrogen, $C_{1-10}$ alkyl, $C_{1-10}$ alkoxy, or halogen; and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

19 Claims, No Drawings

(56) References Cited

U.S. PATENT DOCUMENTS

| | | | |
|---|---|---|---|
| 2012/0172508 A1 | 7/2012 | Jung et al. | |
| 2012/0202034 A1 | 8/2012 | Morizur et al. | |
| 2015/0011688 A1 | 1/2015 | An et al. | |
| 2016/0122534 A1 | 5/2016 | Zhou et al. | |
| 2017/0183478 A1* | 6/2017 | Van Nuffel | C08L 69/00 |
| 2019/0330466 A1 | 10/2019 | Bahn et al. | |
| 2020/0353726 A1* | 11/2020 | Lakeman | B32B 5/022 |
| 2022/0056263 A1* | 2/2022 | Torii | C08L 27/18 |

FOREIGN PATENT DOCUMENTS

| | | | |
|---|---|---|---|
| JP | 2004524423 A | | 8/2004 |
| JP | 4060492 | | 3/2008 |
| JP | 4072936 | | 4/2008 |
| JP | 2008-266362 | | 11/2008 |
| JP | 2010065164 A | | 3/2010 |
| JP | 2012007054 | * | 1/2012 |
| JP | 2012097223 | * | 5/2012 |
| JP | 2013-107979 | | 6/2013 |
| JP | 2013-133348 | | 7/2013 |
| JP | 5264586 | | 8/2013 |
| JP | 5275890 | | 8/2013 |
| JP | 5451505 | | 3/2014 |
| JP | 2016-117811 | | 6/2016 |
| KR | 10-2008-0114680 | | 12/2008 |
| KR | 10-2012-0075813 | | 7/2012 |
| KR | 10-2014-0134658 | | 11/2014 |
| KR | 10-2015-0067387 | | 6/2015 |
| KR | 10-2016-0030126 | | 3/2016 |
| KR | 10-2016-0136297 | | 11/2016 |
| KR | 10-2018-0037506 | | 4/2018 |
| KR | 10-2018-0047837 | | 5/2018 |
| TW | 201035237 A1 | | 10/2010 |
| WO | 1999-028387 | | 6/1999 |
| WO | 2011149030 A1 | | 12/2011 |
| WO | 2014-201224 | | 12/2014 |
| WO | 2018084461 A1 | | 5/2018 |

* cited by examiner

POLYCARBONATE RESIN COMPOSITION AND ARTICLE INCLUDING THE SAME

CROSS-REFERENCE TO RELATED APPLICATIONS

The present application is a National Stage Application of International Application No. PCT/KR2019/014995 filed on Nov. 6, 2019, which claims priority to Korean Patent Application Nos. 10-2018-0135445, 10-2018-0135446, and 10-2019-0140503, filed on Nov. 6, 2018, Nov. 6, 2018, and Nov. 5, 2019, respectively, the disclosures of which are hereby incorporated by reference herein in their entirety.

TECHNICAL FIELD

The present invention relates to a polycarbonate resin composition and a molded article including the same. More particularly, the present invention relates to a polycarbonate resin composition having excellent processability and excellent flame retardancy, weather resistance, and transparency, and a molded article produced therefrom.

BACKGROUND

A polycarbonate resin is prepared by condensation polymerization of an aromatic diol such as bisphenol A with a carbonate precursor such as phosgene, and has excellent impact strength, dimensional stability, heat resistance, transparency, etc., and is applied to a wide range of fields such as exterior materials for electrical and electronic products, automobile components, building components, optical components, etc.

In particular, with recent development of lightweight and thinner materials for various electrical and electronic products, polycarbonate resins to be applied thereto are required to have a higher level of flame retardancy.

In order to increase the flame retardancy of polycarbonate, research has been conducted on the use of Br- or Cl-based flame retardants. However, the flame retardation by the corresponding flame retardants has been increasingly prohibited due to toxicity and environmental problems caused by generation of harmful gas. Particularly, products exported to European Union countries are highly regulated, and in the future, small-scale interior/exterior material products are expected to be fully regulated.

Accordingly, studies are being conducted on a material capable of replacing the above flame retardants, and examples thereof include sulfonic acid-based metal salts. Examples of such sulfonic acid-based metal salts include potassium perfluoro butane sulfonate (KFBS), potassium diphenyl sulfonate (KSS), etc. U.S. Pat. No. 3,775,367 describes that such metal salts are used in polycarbonate resins to maintain the excellent flame-retardance of UL-94 V0 grade, and heat resistance and impact strength. According to U.S. Pat. No. 3,775,367, even when a thin molded article having a thickness of about 4 mm is produced by using such a metal salt in a small amount of 0.5% by weight or more, based on the total weight of the composition, UL-94 V0-rated flame-retardancy can be obtained. When thinner molded articles are produced, the amount of the metal salt must be increased in order to obtain the desired flame retardancy. However, an excessive amount of the metal salt causes decomposition of the polycarbonate resin, leading to reduction of flame retardancy.

Techniques of using silicon compounds have been reported as alternative methods of obtaining flame retardancy and heat resistance using flame retardants other than Br- or Cl-based flame retardants (WO 99/028387). However, even in this case, it is difficult to obtain excellent flame retardancy at a thickness of about 2 mm, and there is a problem in that heat resistance decreases when the amount of the flame retardant is increased in order to improve flame retardancy.

Further, low-molecular-weight decomposition products accelerate the decomposition of the resin during combustion, which drastically lowers viscosity of the resin, resulting in a dripping phenomenon in which sparks fall down. To prevent this phenomenon, an anti-dripping agent is often added. However, since the existing anti-dripping agent reduces transparency of the resin composition, it is not easy to meet the anti-dripping property while maintaining the transparency.

PATENT DOCUMENTS (Patent Document 0001) U.S. Pat. No. 3,775,367
(Patent Document 0002) WO 99/028387

SUMMARY

Accordingly, the present invention provides a polycarbonate resin composition exhibiting excellent processability, flame retardancy, weather resistance, and transparency.

Further, the present invention provides a molded article including the polycarbonate resin composition.

To achieve the above objects, the present invention provides a polycarbonate resin composition including the following components:
  (a) a linear polycarbonate resin including a first repeating unit of the following Chemical Formula 1;
  (b) a branched polycarbonate resin including the first repeating unit of the following Chemical Formula 1;
  (c) 0.04 parts by weight to 0.15 parts by weight of a fluorinated sulfonate-based metal salt;
  (d) 1.5 parts by weight to 5.0 parts by weight of phenyl methyl silicone oil having a kinematic viscosity of 5 mm$^2$/sec to 60 mm$^2$/sec at 25° C.; and
  (e) 0.05 parts by weight to 0.2 parts by weight of a phenyl methyl silicone resin,
wherein the parts by weight of the fluorinated sulfonate-based metal salt, the phenyl methyl silicone oil, and the phenyl methyl silicone resin are based on 100 parts by weight of the linear polycarbonate resin and the branched polycarbonate resin,

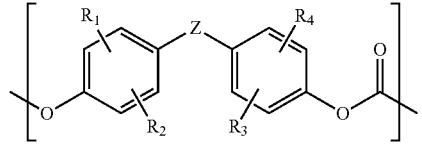

Chemical Formula 1 wherein in Chemical Formula 1:
  $R_1$ to $R_4$ are each independently hydrogen, $C_{1-10}$ alkyl, $C_{1-10}$ alkoxy, or halogen; and
  Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Further, the present invention provides a molded article including the polycarbonate resin composition.

The polycarbonate resin composition according to the present invention and the molded article thereof can exhibit excellent processability, flame retardancy, weather resistance, and transparency.

Accordingly, the polycarbonate resin composition of the present invention and the molded article thereof are suitable for blow molding and injection molding processes, and can be appropriately used as a material for electrical and electronic parts, parts for lighting equipment, etc.

DETAILED DESCRIPTION

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the present invention.

Hereinafter, a polycarbonate resin composition according to specific embodiments of the present invention and a molded article thereof will be described in more detail.

First, the terminology used herein is used for the purpose of describing particular embodiments only, and is not intended to limit the present invention. The singular expression used herein can include the plural expression unless it is differently expressed contextually.

Polycarbonate Resin Composition

A polycarbonate resin composition according to one embodiment of the present invention can include:
(a) a linear polycarbonate resin including a first repeating unit of the following Chemical Formula 1;
(b) a branched polycarbonate resin including the first repeating unit of the following Chemical Formula 1;
(c) 0.04 parts by weight to 0.15 parts by weight of a fluorinated sulfonate-based metal salt;
(d) 1.5 parts by weight to 5.0 parts by weight of phenyl methyl silicone oil having a kinematic viscosity of 5 mm$^2$/sec to 60 mm$^2$/sec at 25° C.; and
(e) 0.05 parts by weight to 0.2 parts by weight of a phenyl methyl silicone resin,
wherein the parts by weight of the fluorinated sulfonate-based metal salt, the phenyl methyl silicone oil, and the phenyl methyl silicone resin are based on 100 parts by weight of the linear polycarbonate resin and the branched polycarbonate resin,

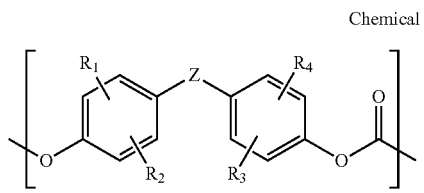

Chemical Formula 1 wherein in Chemical Formula 1:
$R_1$ to $R_4$ are each independently hydrogen, $C_{1-10}$ alkyl, $C_{1-10}$ alkoxy, or halogen; and
Z is $C_{1-10}$ alkylene unsubstituted or substituted with phenyl, $C_{3-15}$ cycloalkylene unsubstituted or substituted with $C_{1-10}$ alkyl, O, S, SO, SO$_2$, or CO.

The polycarbonate resin composition according to one embodiment of the present invention includes the linear polycarbonate resin and the branched polycarbonate resin at the same time. The branched polycarbonate resin includes the first repeating unit as a basic main chain, and has a structure in which a plurality of the first repeating units are connected to each other via the branched second repeating unit according to a branching agent included during polymerization, and thus an entanglement phenomenon is enhanced. Therefore, as compared with the use of the linear polycarbonate resin alone, the polycarbonate resin composition can have excellent melt strength, thereby exhibiting more excellent processability at the time of blow molding.

Further, the polycarbonate resin composition according to the present invention includes the linear polycarbonate resin and the branched polycarbonate resin, together with a fluorinated sulfonate-based metal salt, phenyl methyl silicone oil, and a phenyl methyl silicone resin as flame retardants. Due to interactions therebetween, the polycarbonate resin composition can exhibit flame-retardancy of UL-94 V0 grade while exhibiting excellent fluidity, processability, weather resistance, and transparency.

Accordingly, the polycarbonate resin composition according to one embodiment of the present invention can be, but is not limited to, used as a material for electrical and electronic parts, parts for lighting equipment, etc. which are required to have the above properties.

Hereinafter, the polycarbonate resin composition according to one embodiment of the present invention will be described in more detail.

(a) Linear Polycarbonate Resin

The 'linear polycarbonate resin' according to the present invention refers to a resin including the polycarbonate-based first repeating unit of Chemical Formula 1, and is distinguished from the branched polycarbonate resin in that it does not include a branched repeating unit described below.

Specifically, the repeating unit of Chemical Formula 1 is formed by reacting an aromatic diol compound with a carbonate precursor.

In Chemical Formula 1, preferably, $R_1$ to $R_4$ are each independently hydrogen, methyl, chloro, or bromo.

Further, preferably, Z is linear or branched $C_{1-10}$ alkylene unsubstituted or substituted with phenyl, and more preferably, methylene, ethane-1,1-diyl, propane-2,2-diyl, butane-2,2-diyl, 1-phenylethane-1,1-diyl, or diphenyl methylene. Further, Z is preferably cyclohexane-1,1-diyl, O, S, SO, SO$_2$, or CO.

The repeating unit of Chemical Formula 1 can be derived from an aromatic diol compound of the following Chemical Formula 1-1:

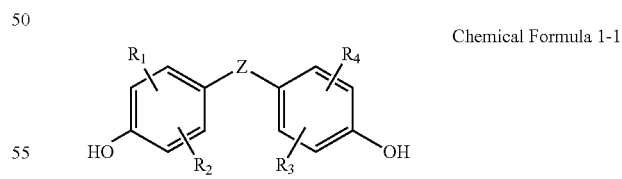

Chemical Formula 1-1 wherein in Chemical Formula 1-1, $R_1$ to $R_4$ and Z are the same as defined in Chemical Formula 1.

Non-limiting examples of the repeating unit of Chemical Formula 1 can be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, bis(4-hydroxyphenyl)diphenylmethane, and a,ω-bis [3-(o-hydroxyphenyl)propyl]polydimethyl siloxane.

The phrase 'derived from aromatic diol compounds' means that a hydroxy group of the aromatic diol compound of Chemical Formula 1-1 is reacted with the carbonate precursor to form the repeating unit of Chemical Formula 1.

For non-limiting example, when bisphenol A, which is an aromatic diol compound, is polymerized with triphosgene, which is a carbonate precursor, the repeating unit of Chemical Formula 1 can have the following Chemical Formula 1-2:

Chemical Formula 1-2

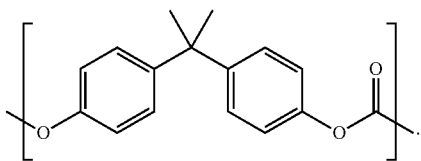

As the carbonate precursor, one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromophosgene and bishaloformate can be used. Preferably, triphosgene or phosgene can be used.

The linear polycarbonate resin can have a weight average molecular weight (Mw) of 1,000 g/mol to 100,000 g/mol, preferably 10,000 g/mol to 60,000 g/mol, and more preferably 15,000 g/mol to 50,000 g/mol. More preferably, the weight average molecular weight (Mw) is 17,000 g/mol or more, 18,000 g/mol or more, or 20,000 g/mol or more. Further, the weight average molecular weight is 43,000 g/mol or less, 42,000 g/mol or less, or 41,000 g/mol or less. In this regard, the weight average molecular weight refers to a converted value with respect to a standard polycarbonate (PC Standard), as measured by GPC (gel permeation chromatography).

Further, the linear polycarbonate resin has a melt index (MI) of 2 g/10 min to 50 g/10 min, or 3 g/10 min to 40 g/10 min according to ASTM D1238 (as measured at 300° C. and a load of 1.2 kg for 10 minutes), which is preferred in terms of stable expression of physical properties of the resin composition.

Further, the linear polycarbonate resin can be present in an amount of 50% by weight to 80% by weight, or 50% by weight to 70% by weight, or 55% by weight to 65% by weight, based on the total weight of the linear polycarbonate resin and the branched polycarbonate resin.

If the amount of the linear polycarbonate resin is too small, there is a problem in that processability can be reduced. On the contrary, if the amount of the linear polycarbonate resin is too large, there is a problem in the effect of preventing dripping.

Meanwhile, the above-described linear polycarbonate resin can be directly prepared according to a known method of polymerizing a general aromatic polycarbonate resin using the aromatic diol compound of Chemical Formula 1-1 and a carbonate precursor as starting materials.

As the polymerization method, for example, an interfacial polymerization method can be used. In this case, the polymerization reaction can be carried out at an atmospheric pressure and a low temperature, and it is easy to control a molecular weight. The interfacial polymerization can be preferably conducted in the presence of an acid binder and an organic solvent. Furthermore, the interfacial polymerization can include, for example, the steps of conducting pre-polymerization, adding a coupling agent, and then conducting polymerization again. In this case, a polycarbonate having a high molecular weight can be obtained.

The materials used in the interfacial polymerization are not particularly limited as long as they can be used in the polymerization of polycarbonates. The used amounts thereof can be adjusted as required.

The acid binder can include, for example, alkali metal hydroxides such as sodium hydroxide, potassium hydroxide, etc., or amine compounds such as pyridine, etc.

The organic solvent is not particularly limited as long as it is a solvent that is usually used in the polymerization of polycarbonates. For example, halogenated hydrocarbons such as methylene chloride, chlorobenzene, etc., can be used.

Further, during the interfacial polymerization, a reaction accelerator, for example, a tertiary amine compound, a quaternary ammonium compound, or a quaternary phosphonium compound, such as triethylamine, tetra-n-butylammonium bromide, tetra-n-butylphosphonium bromide, etc., can be further used for accelerating the reaction.

In the interfacial polymerization, a reaction temperature can be preferably 0° C. to 40° C., and a reaction time can be preferably 10 minutes to 5 hours. Further, during the interfacial polymerization reaction, pH can be preferably maintained at 9 or more, or 11 or more.

In addition, the interfacial polymerization reaction can be carried out by further including a molecular weight modifier. The molecular weight modifier can be added before the initiation of polymerization, during the initiation of polymerization, or after the initiation of polymerization.

As the molecular weight modifier, mono-alkyl phenol can be used. For example, the mono-alkyl phenol is one or more selected from the group consisting of p-tert-butyl phenol, p-cumyl phenol, decyl phenol, dodecyl phenol, tetradecyl phenol, hexadecyl phenol, octadecyl phenol, eicosyl phenol, docosyl phenol, and triacontyl phenol. Preferably, the mono-alkyl phenol can be p-tert-butylphenol, and in this case, the effect of adjusting the molecular weight is great.

The molecular weight modifier can be, for example, included in an amount of 0.01 part by weight or more, 0.1 part by weight or more, or 1 part by weight or more, and 10 parts by weight or less, 6 parts by weight or less, or 5 parts by weight, based on 100 parts by weight of the aromatic diol compound. Within the above range, a desired molecular weight can be obtained.

(b) Branched Polycarbonate Resin

The 'branched polycarbonate resin' according to the present invention refers to a branched polycarbonate resin including the polycarbonate-based first repeating unit of Chemical Formula 1. More specifically, it refers to a copolycarbonate resin further including a trivalent or tetravalent branched second repeating unit connecting a plurality of the first repeating units to each other, in addition to the polycarbonate-based first repeating unit of Chemical Formula 1.

The description of the first repeating unit is the same as described above.

Further, the trivalent or tetravalent second repeating unit refers to a repeating unit formed by being grafted as branches onto a main chain by a branching agent which is added during polymerization of the aromatic diol compound of Chemical Formula 1-1 and the carbonate precursor.

Specifically, the trivalent or tetravalent second repeating unit can be derived from a branching agent which is a phenol derivative compound having three or four hydroxyl groups, for example, one or more branching agents selected from the group consisting of 1,1,1-tris(4-hydroxyphenyl)ethane, 1,3,5-tris-(2-hydroxyethyl)cyanuric acid, 4,6-dimethyl-2,4,6-tris-(4-hydroxyphenyl)-heptane-2,2,2-bis [4,4'-(dihydroxyphenyl)cyclohexyl] propane, 1,3,5-trihydroxybenzene, 1,2,3-trihydroxybenzene, 1,4-bis-(4',4''-dihydroxytriphenyl methyl)-benzene, 2', 3',4'-trihydroxyacetophenone, 2,3,4-trihydroxybenzoic acid, 2,3,4,-trihydroxybenzophenone, 2,4,4'-trihydroxybenzophenone, 2',4',6'-trihydroxy-3-(4-hydroxyphenyl)propiophenone, pentahydroxyflavone, 3,4,5-trihydroxyphenylethylamine, 3,4-trihydroxyphenylethylalcohol, 2,4,5-trihydroxypyrimidine, tetrahydroxy-1,4-quinone hydrate, 2,2',4,4'-tetrahydroxybenzophenone, and 1,2,5,8-tetrahydroxyanthraquinone.

The phrase 'derived from a branching agent' means that three or four hydroxyl groups of the above-described branching agent are reacted with the carbonate precursor to be graft-polymerized with a plurality of the repeating units of Chemical Formula 1, thereby forming the trivalent or tetravalent second repeating unit.

The second repeating unit can have the following Chemical Formula 2:

Chemical Formula 2

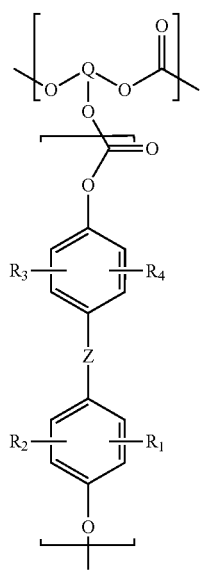

wherein in Chemical Formula 2, $R_1$ to $R_4$ and Z are the same as defined in Chemical Formula 1, and Q is a trivalent or tetravalent phenol derivative compound derived from the branching agent.

For a non-limiting example, when bisphenol A as the aromatic diol compound, triphosgene as the carbonate precursor, and 1,1,1,-tris(4'-hydroxyphenyl) ethane (THPE) as the branching agent are used to perform polymerization, the repeating unit of Chemical Formula 2 can have the following Chemical Formula 2-1:

Chemical Formula 2-1

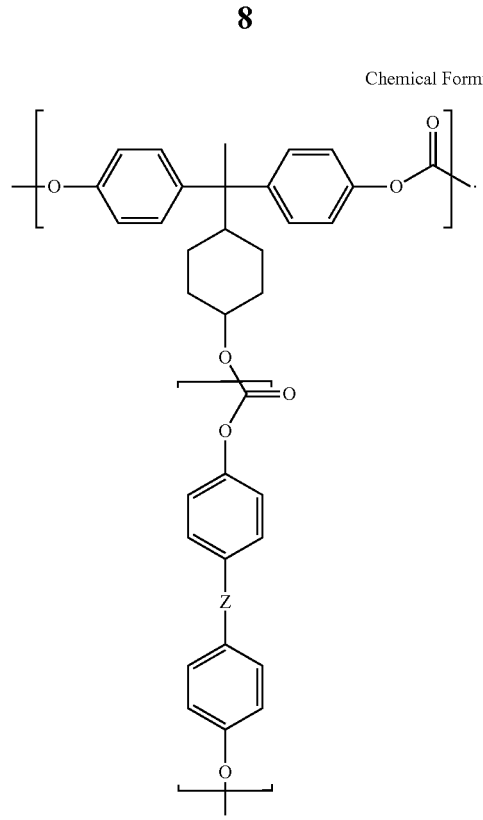

The branched polycarbonate resin can include 98 mol % to 99.999 mol % of the first repeating unit and 0.001 mol % to 2 mol % of the second repeating unit. Alternatively, the branched polycarbonate resin can include 98 mol % to 99.99 mol % of the first repeating unit and 0.01 mol % to 2 mol % of the second repeating unit. Alternatively, the branched polycarbonate resin can include 98 mol % to 99.9 mol % of the first repeating unit and 0.1 mol % to 2 mol % of the second repeating unit. If the amount of the second repeating unit is excessively small, it is difficult to sufficiently achieve improvement in the extensional viscosity property due to the branched structure. On the contrary, if the amount of the second repeating unit is excessively large, a large amount of gel can be formed to deteriorate physical properties.

The branched polycarbonate resin can have a weight average molecular weight of 10,000 g/mol to 100,000 g/mol, preferably 20,000 g/mol to 50,000 g/mol. More preferably, the weight average molecular weight (Mw) can be 10,000 g/mol or more, 21,000 g/mol or more, 22,000 g/mol or more, 23,000 g/mol or more, 24,000 g/mol or more, 25,000 g/mol or more, 26,000 g/mol or more, 27,000 g/mol or more, or 28,000 g/mol or more. Further, the weight average molecular weight can be 100,000 g/mol or less, 50,000 g/mol or less, 45,000 g/mol or less, 42,000 g/mol or less, or 40,000 g/mol or less. In this regard, the weight average molecular weight refers to a converted value with respect to a standard polycarbonate (PC Standard), as measured by GPC (gel permeation chromatography).

Further, the branched polycarbonate resin has a melt index (MI) of 1 g/10 min to 50 g/10 min, or 1.5 g/10 min to 40 g/10 min according to ASTM D1238 (as measured at 300° C. and a load of 1.2 kg for 10 minutes), which is preferred in terms of stable expression of physical properties of the resin composition.

Further, the branched polycarbonate resin can be included in an amount of 20% by weight to 50% by weight, or 30% by weight to 50% by weight, or 35% by weight to 45% by weight, based on the total weight of the linear polycarbonate resin and the branched polycarbonate resin.

If the amount of the branched polycarbonate resin is too small, there is a problem in the effect of preventing dripping. On the contrary, if the amount of the branched polycarbonate resin is too large, there is a problem in that processability can be reduced.

Meanwhile, the above-described branched polycarbonate resin can be directly prepared according to a known method of polymerizing a general aromatic polycarbonate resin using the aromatic diol compound of Chemical Formula 1-1, the carbonate precursor, and the branching agent as starting materials. As the polymerization method, for example, an interfacial polymerization method can be used. The interfacial polymerization can be explained with reference to the above description.

(c) Fluorinated Sulfonate-Based Metal Salt

The flame retardant according to the present invention can be used as an alternative to Br- or Cl-based flame retardants having toxicity and environmental problems caused by generation of harmful gas, and can be used by adding to the polycarbonate for excellent flame retardancy.

Polycarbonate has relatively excellent mechanical properties, electrical properties, and weather resistance, as compared with other kinds of resins, but its flame retardancy is poor. Thus, to apply polycarbonate in various fields requiring flame retardancy, it is necessary to improve flame retardancy. Therefore, in the present invention, in addition to the above-described polycarbonate resin, the fluorinated sulfonate-based metal salt, and phenyl methyl silicone oil and a phenyl methyl silicone resin described below are further included to improve flame retardancy. Further, very excellent transparency can be obtained due to low haze.

Here, the 'fluorinated sulfonate-based metal salt' means a salt compound of a fluorinated sulfonic acid ion and a metal ion, which results in an increase in the char formation rate of the polycarbonate, thereby contributing to the improvement of the flame retardancy of the polycarbonate resin composition.

For example, the fluorinated sulfonate-based metal salt can be one or more compounds selected from the group consisting of sodium trifluoromethyl sulfonate, sodium perfluoroethyl sulfonate, sodium perfluorobutyl sulfonate, sodium perfluoroheptyl sulfonate, sodium perfluorooctyl sulfonate, potassium perfluorobutyl sulfonate, potassium perfluorohexyl sulfonate, potassium perfluorooctyl sulfonate, calcium perfluoromethane sulfonate, rubidium perfluorobutyl sulfonate, rubidium perfluorohexyl sulfonate, cesium trifluoromethyl sulfonate, cesium perfluoroethyl sulfonate, cesium perfluorohexyl sulfonate, and cesium perfluorooctyl sulfonate.

Preferably, the fluorinated sulfonate-based metal salt can be potassium perfluorobutyl sulfonate.

Further, the fluorinated sulfonate-based metal salt can be included in an amount of 0.04 parts by weight or more, or 0.08 parts by weight or more and 0.15 parts by weight or less, or 0.12 parts by weight or less, based on the total 100 parts by weight of the linear polycarbonate resin and the branched polycarbonate resin.

If the amount of the fluorinated sulfonate-based metal salt is too small, there is a problem in that flame retardancy can be reduced. On the contrary, if the amount of the fluorinated sulfonate-based metal salt is too large, there is a problem in that transparency can be reduced. In this respect, therefore, the fluorinated sulfonate-based metal salt is preferably included within the above range.

Meanwhile, the fluorinated sulfonate-based metal salt has excellent flame retardancy, but has a disadvantage of generating bubbles during injection molding of a composition including the same. For this reason, there has been an attempt to use sodium dodecylbenzene sulfonate as an organic sulfonate-based flame retardant replacing the fluorinated sulfonate-based metal salt. However, sodium dodecylbenzene sulfonate has a disadvantage of greatly reducing transparency or mechanical strength of the polycarbonate resin.

Accordingly, the polycarbonate resin composition of the present invention can include no sodium dodecylbenzenesulfonate while including phenyl methyl silicone oil and the phenyl methyl silicone resin described below, in addition to the fluorinated sulfonate-based metal salt, thereby maintaining flame retardancy and preventing bubble generation by the fluorinated sulfonate-based metal salt, and achieving excellent flame retardancy and processability at the same time.

(d) Phenyl Methyl Silicone Oil

Meanwhile, the polycarbonate resin composition according to the present invention can further include phenyl methyl silicone oil having a kinematic viscosity of 5 mm$^2$/sec to 60 mm$^2$/sec at 25° C., in order to improve flame retardancy.

Here, the 'phenyl methyl silicone oil' means a silicone polymer including a methyl group and a phenyl group as a side chain or terminal substituent of a siloxane repeating unit, and preferably, a silicone polymer including a methyl group as a terminal substituent and a phenyl group as a side chain substituent. Such a phenyl methyl silicone oil can contribute to improvement of heat resistance and flame retardancy of the polycarbonate resin composition by the repeating siloxane main chain, and can exhibit the effect of improving flame retardancy by essentially including the phenyl group.

The phenyl methyl silicone oil can have the kinematic viscosity of 5 mm$^2$/sec to 60 mm$^2$/sec at 25° C. Specifically, the phenyl methyl silicone oil can have the kinematic viscosity (mm$^2$/sec) of 6 or more, 7 or more, 8 or more, 9 or more, or 10 or more at 25° C. Further, its kinematic viscosity (mm$^2$/sec) can be 50 or less, 40 or less, 30 or less, 25 or less, or 20 or less at 25° C. If the kinematic viscosity of the phenyl methyl silicone oil is less than 5 mm$^2$/sec, high volatility can generate bubbles. On the contrary, if the kinematic viscosity of the phenyl methyl silicone oil is more than 60 mm$^2$/sec, transparency can be reduced. In this respect, therefore, phenyl methyl silicone satisfying the above-described range of kinematic viscosity is preferably used.

Preferably, the phenyl methyl silicone oil can be a silicone polymer including a phenyl trimethicone repeating unit. Specifically, the phenyl methyl silicone oil can have the following Chemical Formula 3:

Chemical Formula 3

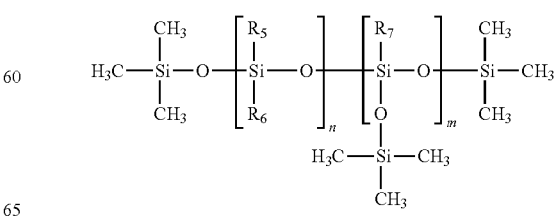

wherein in Chemical Formula 3:
R$_5$ and R$_6$ are each independently C$_{1-10}$ alkyl, C$_{1-10}$ alkenyl, or C$_{6-10}$ aryl;
R$_7$ is phenyl;
n is an integer from 0 to 10, and
m is an integer from 1 to 10.

More preferably, in Chemical Formula 3, at least one of R$_5$ and R$_6$ can be a phenyl group.

For example, the phenyl methyl silicone oil can be a compound of the following Chemical Formula 3-1, in which all of R$_5$ to R$_7$ in Chemical Formula 3 are phenyl groups:

Chemical Formula 3-1

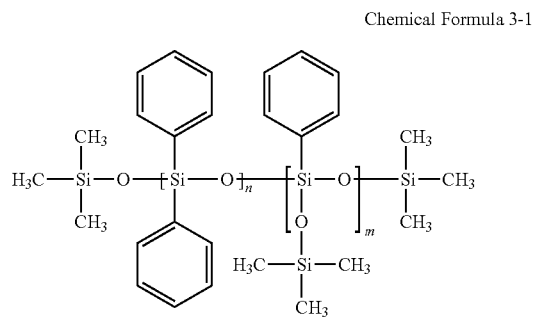

wherein in Chemical Formula 3-1, n and m are the same as defined in Chemical Formula 3.

Further, the phenyl methyl silicone oil can be included in an amount from 1.5 parts by weight or more, or 1.8 parts by weight or more to 5.0 parts by weight or less, or 4.5 parts by weight or less, based on the total 100 parts by weight of the linear polycarbonate resin and the branched polycarbonate resin.

If the amount of the phenyl methyl silicone oil is too small, there is a problem in that flame retardancy can be reduced. On the contrary, if the amount of the phenyl methyl silicone oil is too large, there is a problem in that transparency can be reduced. In this respect, therefore, the phenyl methyl silicone oil is preferably included within the above range.

(e) Phenyl Methyl Silicone Resin

Meanwhile, the polycarbonate resin composition according to the present invention can further include a phenyl methyl silicone resin in order to prevent dripping and to improve flame retardancy.

Here, the 'phenyl methyl silicone resin' is a network structured polyorganosiloxane resin including both phenyl and methyl substituents and having solid-phase properties. The phenyl methyl silicone resin is distinguished from the aforementioned (d) phenyl methyl silicone oil in that it is in a solid phase.

As the phenyl methyl silicone resin, KR-480 available from Shinetsu Co., Ltd., etc. can be used.

As the phenyl methyl silicone resin having such a structure is used, the anti-dripping effect can be obtained.

The silicone resin can be included in an amount from 0.05 parts by weight or more, or 0.08 parts by weight or more, to 0.2 parts by weight or less, or 0.1 part by weight or less, based on the total 100 parts by weight of the linear polycarbonate resin and the branched polycarbonate resin.

If the amount of the phenyl methyl silicone resin is too small, there is a problem in that the anti-dripping effect can be reduced. On the contrary, if the amount of the phenyl methyl silicone resin is too large, there is a problem in that transparency can be reduced. In this respect, therefore, the phenyl methyl silicone resin is preferably included within the above range.

(f) Epoxy-Based Hydrolysis-Resistant Agent

Meanwhile, the polycarbonate resin composition according to the present invention can further include an epoxy-based hydrolysis-resistant agent in order to improve hydrolysis resistance.

As the epoxy-based hydrolysis-resistant agent, a compound having a structure in which an epoxy group is fused into an aliphatic ring, can be used, and examples of the hydrolysis-resistant agent having the epoxy-fused aliphatic ring can include 2021P(3,4-Epoxycyclohexylmethyl 3,4-epoxycyclohexanecarboxylate) available from Daicel, Corp.

Further, the epoxy-based hydrolysis-resistant agent can be included in an amount from 0.05 parts by weight or more, or 0.06 parts by weight or more, or 0.08 parts by weight or more to 0.2 parts by weight or less, or 0.15 parts by weight or less, or 0.12 parts by weight or less, based on the total 100 parts by weight of the linear polycarbonate resin and the branched polycarbonate resin.

When the amount of the epoxy-based hydrolysis-resistant agent is within the above range, the effect of hydrolysis resistance can be sufficiently achieved without reduction in transparency and flame retardancy of the resin composition. In this respect, therefore, the epoxy-based hydrolysis-resistant agent is preferably included within the above range.

(g) UV Absorber

Meanwhile, the polycarbonate resin composition according to the present invention can further include a UV absorber in order to effectively block UV coming from the outside.

The UV absorber applicable in the present invention can be any UV absorber without particular limitation, as long as it allows a molded film specimen of the polycarbonate resin composition according to the present invention to have light transmittance of 20% or less, preferably 10% or less at a wavelength of 380 nm under a thickness condition of 3 mm.

Preferably, the UV absorber can be one or more selected from the group consisting of a benzotriazole compound, a benzophenone compound, an oxanilide compound, a benzoic acid ester compound, and a triazine compound.

For example, the UV absorber can include benzotriazole compounds such as 2-(2'-hydroxyphenyl)-benzotriazole compounds including 2-(2'-hydroxy-5'-methylphenyl)benzotriazole, 2-(2'-hydroxy-5'-tert-octylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2-hydroxy-5-(1,1,3,3,tetramethylbutyl)phenyl)benzotriazole, 2-(3',5'-di-tert-butyl-2'-hydroxyphenyl)-5-benzotriazole, 2-(3'-tert-butyl-2'-hydroxyphenyl-5'-methylphenyl)-5-benztrizol, 2-(3'-sec-butyl-5'-tert-butyl-2'-hydroxyphenyl)benzotriazole, 2-(2'-hydroxy-4'-octyloxyphenylphenyl)-5-benzotriazole or 2-(3',5'-di-tert-butyl-2'-hydroxyphenyl)benzotriazole, etc.; benzophenone compounds such as 2-hydroxy benzophenone compounds having a 4-hydroxy, 4-methoxy, 4-octyloxy, 4-decyloxy, 4-dodecyloxy, 4-benzyloxy, 4,2',4'-trihydroxy, or 2'-hydroxy-4,4'-dimethoxy functional group; benzoic acid ester compounds such as compounds having a substituted benzoic acid ester structure, including 4-tert-butyl-phenyl salicylate, phenyl salicylate, octylphenyl salicylate, dibenzoyl resorcinol, bis(4-tert-butyl-benzoyl)resorcinol, benzoyl resorcinol, 2,4-di-tert-butylphenyl-3,5'-di-tert-butyl-4-hydroxybenzoate, hexadecyl 3,5-di-tert-butyl-4-4hyroxybenzoate, octadecyl 3,5-di-tert-butyl-4-hydroxybenzoate or 2-methyl-4,6-di-tert-butylphenyl 3,5-di-tert-butyl-4-hydroxybenzoate, etc.; or triazine compounds having a 2,4,6-triphenyl-1,3,5-triazine skeleton, etc., but is not limited thereto.

Further, the UV absorber can be included in an amount from 0.1 part by weight or more, or 0.2 parts by weight or more to 0.5 parts by weight or less, or 0.4 parts by weight or less, based on the total 100 parts by weight of the linear polycarbonate resin and the branched polycarbonate resin.

When the amount of the UV absorber is within the above range, the effect of weather resistance can be sufficiently achieved without reduction in transparency and flame retardancy of the resin composition. In this respect, therefore, the UV absorber is preferably included within the above range.

(h) Additives

In addition to the above-described components, the polycarbonate resin composition according to the present invention can further include, if necessary, additives such as an impact reinforcing agent; a rheology modifier; a flame retardant such as a phosphorus flame retardant, etc.; a surfactant; a nucleating agent; a coupling agent; a filler; a plasticizer; a lubricant; an antibacterial agent; a mold release agent; a heat stabilizer; an antioxidant; a UV stabilizer; a compatibilizer; a coloring agent; an antistatic agent; a pigment; a dye; a flame proofing agent, etc.

The amount of the additives can vary depending on the physical properties to be provided for the composition. For example, the additives can be included in an amount of 0.01 part by weight to 10 parts by weight, based on the total 100 parts by weight of the linear polycarbonate resin and the branched polycarbonate resin.

However, to prevent reduction in heat resistance, impact strength, and chemical resistance of the polycarbonate resin composition, which is caused by adding the additives, the total amount of the additives can be preferably 20 parts by weight or less, or 15 parts by weight or less, or 10 parts by weight or less, based on the total 100 parts by weight of the linear polycarbonate resin and the branched polycarbonate resin.

The polycarbonate resin composition of one embodiment of the present invention can exhibit excellent flame retardancy of V-0 grade, as measured for a specimen having a thickness of 1.5 mm in accordance with UL 94 standard.

Further, the polycarbonate resin composition of one embodiment of the present invention can exhibit the flame retardancy of V-0 grade before and after a water exposure test (immersion protocol) and a UV exposure test (weather-O-meter protocol), as measured for a film specimen having a thickness of 1.5 mm in accordance with UL 746C, indicating excellent weather resistance.

Further, the polycarbonate resin composition of one embodiment of the present invention can exhibit tensile impact from 310 $kJ/m^2$ or more, or 315 $kJ/m^2$ or more, or 320 $kJ/m^2$ or more, to 360 $kJ/m^2$ or less, or 350 $kJ/m^2$ or less, or 340 $kJ/m^2$ or less, as measured in accordance with ASTM D1822(¼ inch), indicating excellent impact strength.

Further, the polycarbonate resin composition of one embodiment of the present invention can exhibit tensile strength from 60 MPa or more, or 62 MPa or more, or 64 MPa or more, to 80 MPa or less, or 75 MPa or less, or 70 MPa or less, as measured for a specimen having a thickness of 1.5 mm in accordance with ASTM D638 (1.5 mm), indicating excellent tensile strength.

Further, when the tensile impact of the polycarbonate resin composition of one embodiment of the present invention is measured for a film specimen having a thickness of 1.5 mm in accordance with a water exposure test (immersion protocol) of UL 746C, the tensile impact value after the exposure test can be 50% or more of the value measured before the exposure test.

Simultaneously, when the tensile impact and tensile strength of the polycarbonate resin composition of one embodiment of the present invention are measured for the film specimen having a thickness of 1.5 mm in accordance with a UV exposure test (weather-O-meter protocol) of UL 746C, each value after the exposure test can be 70% or more of the value measured before the exposure test.

Further, the polycarbonate resin composition of one embodiment of the present invention can exhibit room-temperature impact strength from 790 J/m or more, or 800 J/m or more, or 810 J/m or more to 900 J/m or less, or 880 J/m or less, or 860 J/m or less, as measured at 23° C. in accordance with ASTM D256 (⅛ inch, Notched Izod), indicating excellent room-temperature impact strength.

Further, the polycarbonate resin composition of one embodiment of the present invention can exhibit haze from 0.01% or more to 2.4% or less, or 2.0% or less, or 1.0% or less, or 0.8% or less, or 0.6% or less, or 0.5% or less, as measured for an injection-molded specimen having a thickness of 3 mm in accordance with ASTM D1003, indicating excellent weather resistance.

Further, the polycarbonate resin composition of one embodiment of the present invention can exhibit a spiral length from 50 cm or more, or 51 cm or more, or 53 cm or more to 65 cm or less, or 60 cm or less, or 58 cm or less, as measured by injection-molding at 330° C. using a spiral mold having a thickness of 2.5 mm and a width of 10 mm, indicating excellent processability.

Further, the polycarbonate resin composition of one embodiment of the present invention can exhibit a melt index (MI) from 7 g/10 min or more, or 8 g/10 min or more to 50 g/10 min or less, or 30 g/10 min or less, or 20 g/10 min or less, as measured in accordance with ASTM D1238 (at 300° C. under a load of 1.2 kg for 10 minutes), indicating excellent fluidity.

Further, the polycarbonate resin composition of one embodiment of the present invention can exhibit the number of drips of 0, as measured under UL94 vertical test conditions, indicating excellent dripping flame retardancy.

Further, the polycarbonate resin composition of one embodiment of the present invention can exhibit a total combustion time (sec) of 27 sec or more, or 28 sec or more, 29 sec or more, 30 sec or more, 31 sec or more, or 32 sec or more and 50 sec or less, or 45 sec or less, or 40 sec or less, as measured under UL94 vertical test conditions, indicating excellent flame retardancy.

Resin Molded Article

According to another embodiment of the present invention, provided is a molded article including the above-described polycarbonate resin composition.

The molded article is an article obtained by performing molding such as extrusion, injection, or casting using the above-described polycarbonate resin composition as a raw material.

The molding method and conditions can be appropriately selected and controlled according to the kind of the molded article.

For non-limiting example, the molded article can be obtained by a method of mixing and extrusion-molding the polycarbonate resin composition to prepare a pellet, and drying the pellet, followed by injection.

In particular, as the molded article is produced from the polycarbonate resin composition, it can exhibit excellent processability, flame retardancy, and transparency, thereby being appropriately used as a material for electrical and electronic parts, parts for lighting equipment, etc.

Hereinafter, preferred examples will be provided for better understanding of the present invention. However, the following examples are provided only for illustrating the present invention, but the present invention is not limited thereby.

EXAMPLES

Materials Used

The following materials were used in Examples and Comparative Examples.

(a) Linear Copolycarbonate Resin (a-1) LUPOY PC1080-70 (weight average molecular weight: 19,600 g/mol) produced by LG Chem Ltd., which is a polycarbonate including a repeating unit of Chemical Formula 1-2.

(a-2) LUPOY PC1300-30 (weight average molecular weight: 21,100 g/mol) produced by LG Chem Ltd., which is a polycarbonate including a repeating unit of Chemical Formula 1-2.

(a-3) LUPOY PC1300-15 (weight average molecular weight: 27,800 g/mol) produced by LG Chem Ltd., which is a polycarbonate including a repeating unit of Chemical Formula 1-2.

(b) Branched Polycarbonate Resin (b-1) LUPOY PC1600-03 produced by LG Chem Ltd., which is a polycarbonate having a weight average molecular weight of 37,600 g/mol and including repeating units of Chemical Formulae 1-2 and 2-1.

(c) Organic Sulfonate-Based Metal Salt (c-1) FR-2025 produced by 3M, Com., which is a potassium perfluorobutyl sulfonate (KPFBS).

(c-2) KSS-FR produced by Arichem, LLC., which is a potassium diphenylsulfone sulfonate (KSS).

(c-3) SDBS (sodium dodecylbenzene sulfonate) produced by TCI Chemical, Co., Ltd.

(d) Phenyl Methyl Silicone Oil (d-1) KR-56A produced by ShinEstu, Chemical Co., Ltd., Japan, which is a phenyl methyl silicone oil of the following Chemical Formula 3-1 having a kinematic viscosity of 15 mm$^2$/sec at 25° C.:

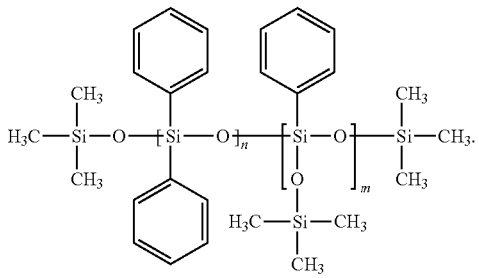

Chemical Formula 3-1

(d-2) KR-2710 produced by ShinEstu, Chemical Co., Ltd., Japan, which is a phenyl methyl silicone oil having a kinematic viscosity of 50 mm$^2$/sec at 25° C.

(d-3) KR-511 produced by ShinEstu, Chemical Co., Ltd., Japan, which is a phenyl methyl silicone oil having a kinematic viscosity of 100 mm$^2$/sec at 25° C.

(d-4) DC-550 produced by Dow Corning, Corp., which is a linear phenyl methyl silicone oil having a kinematic viscosity of 125 mm$^2$/sec at 25° C.

(e) Phenyl Methyl Silicone Resin (e-1) KR-480 produced by ShinEstu, Chemical Co., Ltd., Japan, which is a phenyl methyl silicone resin.

(f) Epoxy-Based Hydrolysis-Resistant Agent (f-1) Celloxide 2021P produced by Daicel Corporation, which is (3',4'-epoxycyclohexane)methyl 3,4-epoxycyclohexylcarboxylate.

(g) UV Absorber (g-1) TINUVIN produced by 329 BASF, AG.

(h) Additives (h-1) Alkanox 240 produced by Addivant, Corp., which is tris(2,4-di-tert-butylphenyl) phosphite.

(h-2) FACI L348 produced by FACI, which is pentaerythrityl tetraethylhexanoate (PETS).

Examples and Comparative Examples

The respective components described in the following Tables 1 to 4 were mixed, and then pelletized at a speed of 80 kg per time using a biaxial extruder (L/D=36, Φ=45, barrel temperature: 240° C.), and injection-molded using an injection molding machine N-20C of JSW (Ltd.) at a cylinder temperature of 300° C. and a mold temperature of 80° C. to produce each specimen.

Components and amounts used in Examples and Comparative Examples are shown in Tables 1 to 4 below, respectively.

TABLE 1

|  |  | Example 1-1 | Example 1-2 | Example 1-3 | Example 1-4 | Example 1-5 |
|---|---|---|---|---|---|---|
| Linear PC[1] (wt %) | a | a-1(15) a-2(45) | a-1(15) a-2(45) | a-1(15) a-2(45) | a-1(15) a-2(45) | a-3(80) |
| Branched PC[1] (wt %) | b | b-1(40) | b-1(40) | b-1(40) | b-1(40) | b-1(20) |
| Organic sulfonate metal salt (phr)[2] | c | c-1(0.10) | c-1(0.10) | c-1(0.10) | c-1(0.10) | c-1(0.10) |
| Phenyl methyl silicone oil (phr)[2] | d | d-1(2.00) | d-1(3.00) | d-1(4.00) | d-2(3.00) | d-1(4.00) |
| Phenyl methyl silicone resin (phr)[2] | e | e-1(0.10) | e-1(0.10) | e-1(0.10) | e-1(0.10) | e-1(0.10) |

TABLE 1-continued

|  |  | Example 1-1 | Example 1-2 | Example 1-3 | Example 1-4 | Example 1-5 |
|---|---|---|---|---|---|---|
| Additive (phr)[2] | h | h-1(0.05) h-2(0.05) | h-1(0.05) h-2(0.05) | h-1(0.05) h-2(0.05) | h-1(0.05) h-2(0.05) | h-1(0.05) h-2(0.05) |

[1]% by weight with respect to total weight of linear polycarbonate resin and branched carbonate resin
[2]parts by weight with respect to total 100 parts by weight of linear polycarbonate resin and branched carbonate resin

TABLE 2

|  |  | Comparative Example 1-1 | Comparative Example 1-2 | Comparative Example 1-3 | Comparative Example 1-4 | Comparative Example 1-5 | Comparative Example 1-6 | Comparative Example 1-7 | Comparative Example 1-8 | Comparative Example 1-9 |
|---|---|---|---|---|---|---|---|---|---|---|
| Linear PC[1] (wt %) | a | a-3 (100) | a-3 (100) | a-1(15) a-2(45) | a-1(15) a-2(45) | a-1(15) a-2(45) | a-1(15) a-2(45) | a-1(15) a-2(45) | a-1(15) a-2(45) | a-1(15) a-2(45) |
| Branched PC[1] (wt %) | b | — | — | b-1(40) | b-1(40) | b-1(40) | b-1(40) | b-1(40) | b-1(40) | b-1(40) |
| Organic sulfonate metal salt (phr)[2] | c | c-1(0.10) | c-1 (0.10) | c-1 (0.10) | c-1 (0.10) | c-2 (0.30) | c-1 (0.10) | c-1 (0.10) | c-1 (0.10) | c-3 (0.10) |
| Phenyl methyl silicone oil (phr)[2] | d | — | d-1 (2.00) | d-3 (2.00) | d-4 (2.00) | d-1 (2.00) | d-1 (3.00) | d-1 (1.00) | d-1 (2.00) | d-1 (3.00) |
| Phenyl methyl silicone resin (phr)[2] | e | — | e-1 (0.10) | e-1 (0.10) | e-1 (0.10) | e-1 (0.10) | e-1 (0.10) | — | e-1 (0.30) | e-1 (0.10) |
| Additive (phr)[2] | h | h-1 (0.05) h-2 (0.05) | h-1 (0.05) h-2 (0.05) | h-1 (0.05) h-2 (0.05) | h-1 (0.05) h-2 (0.05) | h-1 (0.05) h-2 (0.05) | h-1 (0.05) h-2 (0.05) | h-1 (0.05) h-2 (0.05) | h-1 (0.05) h-2 (0.05) | h-1 (0.05) h-2 (0.05) |

[1]% by weight with respect to total weight of linear polycarbonate resin and branched carbonate resin
[2]parts by weight with respect to total 100 parts by weight of linear polycarbonate resin and branched carbonate resin

TABLE 3

|  |  | Example 2-1 | Example 2-2 | Example 2-3 | Example 2-4 | Example 2-5 | Example 2-6 | Example 2-7 |
|---|---|---|---|---|---|---|---|---|
| Linear PC[1] (wt %) | a | a-1(15) a-2(45) | a-1(15) a-2(45) | a-1(15) a-2(45) | a-1(15) a-2(45) | a-1(15) a-2(45) | a-1(15) a-2(45) | a-1(15) a-2(45) |
| Branched PC[1] (wt %) | b | b-1(40) | b-1(40) | b-1(40) | b-1(40) | b-1(40) | b-1(40) | b-1(40) |
| Organic sulfonate metal salt (phr)[2] | c | c-1(0.10) | c-1(0.15) | c-1(0.10) | c-1(0.10) | c-1(0.10) | c-1(0.10) | c-1(0.10) |
| Phenyl methyl silicone oil (phr)[2] | d | d-1(2.00) | d-1(2.00) | d-1(3.00) | d-1(4.00) | d-1(2.00) | d-1(2.00) | d-1(2.00) |
| Phenyl methyl silicone resin (phr)[2] | e | e-1(0.10) | e-1(0.10) | e-1(0.10) | e-1(0.10) | e-1(0.20) | e-1(0.10) | e-1(0.10) |
| Epoxy-based hydrolysis-resistant agent (phr)[2] | f | f-1(0.10) | f-1(0.10) | f-1(0.10) | f-1(0.10) | f-1(0.10) | f-1(0.20) | f-1(0.10) |
| UV absorber (phr)[2] | g | g-1(0.25) | g-1(0.25) | g-1(0.25) | g-1(0.25) | g-1(0.25) | g-1(0.25) | g-1(0.50) |
| Additive (phr)[2] | h | h-1(0.05) h-2(0.05) | h-1(0.05) h-2(0.05) | h-1(0.05) h-2(0.05) | h-1(0.05) h-2(0.05) | h-1(0.05) h-2(0.05) | h-1(0.05) h-2(0.05) | h-1(0.05) h-2(0.05) |

[1]% by weight with respect to total weight of linear polycarbonate resin and branched carbonate resin
[2]parts by weight with respect to total 100 parts by weight of linear polycarbonate resin and branched carbonate resin

TABLE 4

| | | Comparative Example 2-1 | Comparative Example 2-2 | Comparative Example 2-3 | Comparative Example 2-4 | Comparative Example 2-5 | Comparative Example 2-6 | Comparative Example 2-7 |
|---|---|---|---|---|---|---|---|---|
| Linear PC[1] (wt %) | a | a-3 (100) | a-1(15) a-2(45) | a-1(15) a-2(45) | a-1(15) a-2(45) | a-1(15) a-2(45) | a-1(15) a-2(45) | a-1(15) a-2(45) |
| Branched PC[1] (wt %) | b | — | b-1(40) | b-1(40) | b-1(40) | b-1(40) | b-1(40) | b-1(40) |
| Organic sulfonate metal salt (phr)[2] | c | c-1(0.10) | — | c-1(0.10) | c-1(0.10) | c-1(0.10) | c-1(0.10) | c-3(0.10) |
| Phenyl methyl silicone oil (phr)[2] | d | d-1(2.00) | d-1(2.00) | — | d-3(2.00) | d-1(2.00) | d-1(2.00) | d-1(2.00) |
| Phenyl methyl silicone resin (phr)[2] | e | e-1(0.10) | e-1(0.10) | e-1(0.10) | e-1(0.10) | | e-1(0.10) | e-1(0.10) |
| Epoxy-based hydrolysis-resistant agent (phr)[2] | f | f-1(0.10) | f-1(0.10) | f-1(0.10) | f-1(0.10) | f-1(0.20) | — | f-1(0.10) |
| UV absorber (phr)[2] | g | g-1(0.25) | g-1(0.25) | g-1(0.25) | g-1(0.25) | g-1(0.25) | g-1(0.25) | g-1(0.25) |
| Additive (phr)[2] | h | h-1(0.05) h-2(0.05) | h-1(0.05) h-2(0.05) | h-1(0.05) h-2(0.05) | h-1(0.05) h-2(0.05) | h-1(0.05) h-2(0.05) | h-1(0.05) h-2(0.05) | h-1(0.05) h-2(0.05) |

[1]% by weight with respect to total weight of linear polycarbonate resin and branched carbonate resin
[2]parts by weight with respect to total 100 parts by weight of linear polycarbonate resin and branched carbonate resin Experimental Example The compositions of Examples and Comparative Examples and specimens produced therefrom were measured for physical properties by the following methods, respectively.

1) Melt Index (MI): measured in accordance with ASTM D1238 (under conditions of 300° C. and 1.2 kg).
2) Room temperature impact strength: measured in accordance with ASTM D256 (⅛ inch, Notched Izod) at 23° C.
3) Haze: measured for a specimen having a thickness of 3 mm in accordance with ASTM D1003 using a haze meter.
4) Spiral length: measured as an average length of a total of 10 injection molded-articles after injection molding at 330° C. using a spiral mold having a thickness of 2.5 mm and a width of 10 mm.
5) Number of drips: the number of drips (in the case of dripping spark particles) was measured in accordance with UL 94 vertical test protocol.
6) Total combustion time: measured as the sum of t1, t2, and t3 in accordance with UL94 vertical test criteria of the following Table 5.
7) Flame retardancy (UL 94 Protocol): flame retardancy was tested in accordance with UL 94 standard. In detail, five flame retardant specimens having a thickness of 1.5 mm required for the flame retardancy test were prepared, and tested as follows.

First, each specimen was left in contact with 20 mm high flame for 10 seconds, and then a combustion time (t1) of the specimen was measured, and a combustion aspect was recorded. Then, after the primary flame-contact, the combustion was terminated, and each specimen was left in contact with flame for another 10 seconds. Next, a combustion time (t2) and a glowing time (t3) of the specimen were measured, and a combustion aspect was recorded. The test was equally applied to five specimens, and the specimens were evaluated according to the criteria of Table 5 below.

TABLE 5

| Flame retardancy rating | V-0 | V-1 | V-2 |
|---|---|---|---|
| Each combustion time (t1 or t2 of each specimen) | 10 sec or less | 30 sec or less | 30 sec or less |
| Total combustion time of five specimens (sum of t1 and t2 of five specimens) | 50 sec or less | 250 sec or less | 250 sec or less |
| Combustion time and Glowing time after secondary flame contact (sum of t2 and t3 of each specimen) | 30 sec or less | 60 sec or less | 60 sec or less |
| Whether particle causing flame | None | None | Dropped |

9) Weather resistance 1 (UL 746C immersion protocol): weather resistance was evaluated by a water exposure test in accordance with UL 746C standard. In detail, five specimens having a thickness of 1.5 mm required for the test were prepared, and each specimen was measured for flame retardancy rating, tensile impact and tensile strength values. Next, each specimen was pre-immersed in distilled water at 70° C. for 7 days, and then immersed in distilled water at 23° C. for 30 minutes, and then the tensile impact value was measured. Each specimen was pre-immersed in distilled water at 70° C. for 7 days, and then immersed at 23° C. and relative humidity of 50% for 2 weeks, and then the flame retardancy was rated and compared with the value before exposure.

10) Weather resistance 2 (UL 746C Weather-O-meter protocol): weather resistance was evaluated by a UV exposure test in accordance with UL 746C standard. In detail, five specimens having a thickness of 1.5 mm required for the test were prepared, and each specimen was measured for flame retardancy rating, tensile impact and tensile strength values. Next, a xenon-arc lamp was prepared according to ASTM G151, and each specimen was irradiated with UV for 102 minutes, and then exposed to UV and water spray for the remaining 18 minutes. This cycle of the total 120 minutes was repeatedly carried out until the total time reached 1000 hours. Each specimen was measured for flame retardancy rating, tensile impact and tensile strength values, and compared with the values before exposure. At this time, the test was carried out by irradiation at a wavelength of 340 nm with energy of 0.35 W/m² under operation conditions of a black-panel temperature of 63° C. (error: 3° C.).

In the weather resistance tests 1 and 2, tensile impact was measured in accordance with ASTM D1822 (¼ inch), and tensile strength was measured in accordance with ASTM D638 (1.5 mm).

The results of measuring the physical properties are shown in Tables 6 to 9 below, respectively.

TABLE 6

| Section | Example 1-1 | Example 1-2 | Example 1-3 | Example 1-4 | Example 1-5 |
|---|---|---|---|---|---|
| Melt index (g/10 min) | 15.6 | 16.4 | 17.6 | 16.2 | 16.2 |
| Room temperature impact strength (J/m) | 812 | 821 | 825 | 798 | 842 |
| Haze (%) | 0.38 | 0.42 | 0.51 | 0.43 | 0.52 |
| Spiral length (cm) | 53.6 | 55.2 | 57.3 | 54.1 | 50.8 |
| Number of drips (number) | 0 | 0 | 0 | 0 | 0 |
| Total combustion time (second) | 32.7 | 33.8 | 36.1 | 33.1 | 35.1 |
| UL94 rating | V-0 | V-0 | V-0 | V-0 | V-0 |

TABLE 7

| Section | Comparative Example 1-1 | Comparative Example 1-2 | Comparative Example 1-3 | Comparative Example 1-4 | Comparative Example 1-5 | Comparative Example 1-6 | Comparative Example 1-7 | Comparative Example 1-8 | Comparative Example 1-9 |
|---|---|---|---|---|---|---|---|---|---|
| Melt index (g/10 min) | 15.1 | 17.3 | 15.3 | 15.1 | 17.2 | 14.3 | 15.8 | 14.8 | 18.6 |
| Room temperature impact strength (J/m) | 845 | 815 | 866 | 825 | 788 | 822 | 792 | 833 | 615 |
| Haze (%) | 0.23 | 0.33 | 2.18 | 45.1 | 2.83 | 0.33 | 0.32 | 1.82 | 7.81 |
| Spiral length (cm) | 46.9 | 48.1 | 52.1 | 51.8 | 53.8 | 51.8 | 53.2 | 82.4 | 63.5 |
| Number of drips (number) | 5 | 5 | 4 | 2 | 4 | 3 | 2 | 0 | 5 |
| Total combustion time (second) | 78.2 | 36.1 | 42.1 | 32.1 | 39.3 | 38.2 | 37.3 | 33.3 | 87.3 |
| UL94 rating | V-2 | V-2 | V-2 | V-2 | V-2 | V-2 | V-2 | V-0 | V-2 |

TABLE 8

| | Section | Example 2-1 | Example 2-2 | Example 2-3 | Example 2-4 | Example 2-5 | Example 2-6 | Example 2-7 |
|---|---|---|---|---|---|---|---|---|
| Initial physical properties | Melt index (g/10 min) | 14.8 | 15.0 | 16.0 | 17.1 | 14.7 | 15.4 | 14.7 |
| | Spiral length (cm) | 52.0 | 51.8 | 54.8 | 57.0 | 52.4 | 53.7 | 51.6 |
| | Haze (%) | 0.48 | 1.02 | 0.53 | 0.60 | 2.31 | 0.51 | 0.43 |
| | Tensile impact (kJ/m²) | 324 | 315 | 330 | 332 | 319 | 319 | 326 |
| | Tensile strength (MPa) | 69 | 64 | 67 | 68 | 65 | 67 | 66 |
| UL94 protocol | Number of drips (number) | 0 | 0 | 0 | 0 | 0 | 0 | 0 |
| | Total combustion time (second) | 27.9 | 38 | 29.2 | 32.2 | 30.1 | 37.5 | 39.5 |
| | UL94 rating | V-0 | V-0 | V-0 | V-0 | V-0 | V-0 | V-0 |
| UL 746C immersion protocol | Tensile impact (kJ/m²) | 292 | 300 | 326 | 329 | 319 | 300 | 310 |
| | Tensile strength (MPa) | 63 | 60 | 64 | 65 | 63 | 64 | 61 |
| | UL94 rating | V-0 | V-0 | V-0 | V-0 | V-0 | V-0 | V-0 |
| UL 746C Weather-O-meter protocol | Tensile impact (kJ/m²) | 253 | 236 | 244 | 252 | 236 | 230 | 267 |
| | Tensile strength (MPa) | 55 | 49 | 50 | 51 | 48 | 48 | 56 |
| | UL94 rating | V-0 | V-0 | V-0 | V-0 | V-0 | V-0 | V-0 |

TABLE 9

| | Section | Comparative Example 2-1 | Comparative Example 2-2 | Comparative Example 2-3 | Comparative Example 2-4 | Comparative Example 2-5 | Comparative Example 2-6 | Comparative Example 2-7 |
|---|---|---|---|---|---|---|---|---|
| Initial physical properties | Melt index (g/10 min) | 15.2 | 14.0 | 13.2 | 14.7 | 15.1 | 14.3 | 16.8 |
| | Spiral length (cm) | 47.1 | 49.9 | 45.2 | 51.4 | 52.8 | 51.0 | 60.1 |
| | Haze (%) | 0.33 | 0.42 | 0.31 | 2.32 | 0.44 | 0.48 | 3.41 |
| | Tensile impact (kJ/m$^2$) | 342 | 339 | 338 | 348 | 311 | 319 | 132 |
| | Tensile strength (MPa) | 70 | 67 | 66 | 65 | 63 | 64 | 42 |
| UL94 protocol | Number of drips (number) | 5 | 5 | 5 | 4 | 2 | 0 | 5 |
| | Total combustion time (second) | 57.3 | 60.7 | 49.5 | 47.7 | 35.7 | 30.8 | 79.6 |
| | UL94 rating | V-2 | V-2 | V-2 | V-2 | V-2 | V-0 | V-2 |
| UL 746C immersion protocol | Tensile impact (kJ/m$^2$) | | | | | | 287 | |
| | Tensile strength (MPa) | | | | | | 57 | |
| | UL94 rating | | | | | | V-2 | |
| UL 746C Weather-O-meter protocol | Tensile impact (kJ/m$^2$) | | | | | | 262 | |
| | Tensile strength (MPa) | | | | | | 52 | |
| | UL94 rating | | | | | | V-0 | |

(In Table 9, the weather resistance was not tested for Comparative Examples which were rated as V-2 during the initial UL94 test)

Referring to Tables 6 to 9, the flame retardant polycarbonate resin compositions of the present invention can exhibit all excellent properties in flame retardancy, melt index, impact strength, transparency, weather resistance, etc.

The invention claimed is:

1. A polycarbonate resin composition, comprising:
(a) a linear polycarbonate resin including a repeating unit of the following Chemical Formula 1;
(b) a branched polycarbonate resin including a repeating unit of the following Chemical Formula 1;
(c) 0.04 parts by weight to 0.15 parts by weight of a fluorinated sulfonate-based metal salt;
(d) 1.5 parts by weight to 5.0 parts by weight of a phenyl methyl silicone oil having a kinematic viscosity of 5 mm$^2$/sec to 40 mm$^2$/sec at 25° C.; and
(e) 0.05 parts by weight to 0.2 parts by weight of a phenyl methyl silicone resin,
wherein the parts by weight of the fluorinated sulfonate-based metal salt, the phenyl methyl silicone oil, and the phenyl methyl silicone resin are based on 100 parts by weight of the total weight of the linear polycarbonate resin and the branched polycarbonate resin, and wherein the phenyl methyl silicone oil has a structure of the following Chemical Formula 3:

Chemical Formula 1

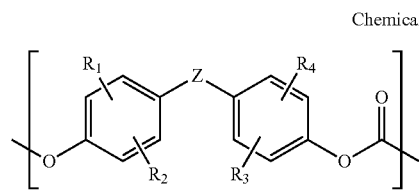

wherein in Chemical Formula 1:
R$_1$ to R$_4$ are each independently hydrogen, C$_{1-10}$ alkyl, C$_{1-10}$ alkoxy, or halogen; and
Z is C$_{1-10}$ alkylene unsubstituted or substituted with phenyl, C$_{3-15}$ cycloalkylene unsubstituted or substituted with C$_{1-10}$ alkyl, O, S, SO, SO$_2$, or CO, Chemical Formula 3

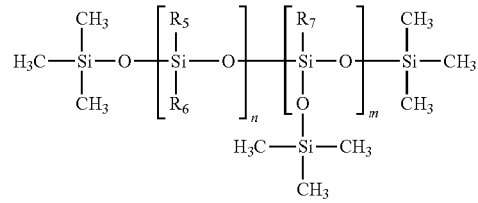

wherein in Chemical Formula 3:
R$_5$ and R$_6$ are each independently C$_{1-10}$ alkyl, C$_{1-10}$ alkenyl, or C$_{6-10}$ aryl;
R$_7$ is phenyl;
n is an integer from 0 to 10; and
m is an integer from 1 to 10.

2. The polycarbonate resin composition of claim 1, wherein the repeating units of Chemical Formula 1 are derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis (4-hydroxyphenyl)-1-phenylethane, and bis(4-hydroxyphenyl)diphenylmethane.

3. The polycarbonate resin composition of claim 1, wherein the repeating units of Chemical Formula 1 have a structure of the following Chemical Formula 1-2:

Chemical Formula 1-2

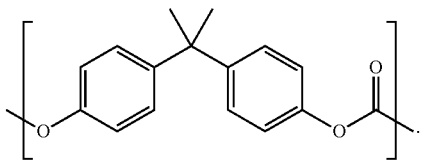

4. The polycarbonate resin composition of claim 1, wherein the branched polycarbonate resin includes a plurality of first repeating units of Chemical Formula 1 and a trivalent or tetravalent second repeating unit connecting the plurality of the first repeating units to each other.

5. The polycarbonate resin composition of claim 4, wherein the second repeating unit is derived from one or more branching agents selected from the group consisting of 1,1,1-tris(4-hydroxyphenyl)ethane, 1,3,5-tris-(2-hydroxyethyl)cyanuric acid, 4,6-dimethyl-2,4,6-tris-(4-hydroxyphenyl)-heptane-2,2,2-bis[4,4'-(dihydroxyphenyl)cyclohexyl] propane, 1,3,5-trihydroxybenzene, 1,2,3-trihydroxybenzene, 1,4-bis-(4',4''-dihydroxytriphenyl methyl)-benzene, 2',3',4'-trihydroxyacetophenone, 2,3,4-trihydroxybenzoic acid, 2,3,4,-trihydroxybenzophenone, 2,4,4'-trihydroxybenzophenone, 2',4',6'-trihydroxy-3-(4-hydroxyphenyl)propiophenone, pentahydroxyflavone, 3,4,5-trihydroxyphenylethylamine, 3,4-trihydroxyphenylethylalcohol, 2,4,5-trihydroxypyrimidine, tetrahydroxy-1,4-quinone hydrate, 2,2',4,4'-tetrahydroxybenzophenone, and 1,2,5,8-tetrahydroxyanthraquinone.

6. The polycarbonate resin composition of claim 4, wherein the second repeating unit has a structure of the following Chemical Formula 2-1:

Chemical Formula 2-1

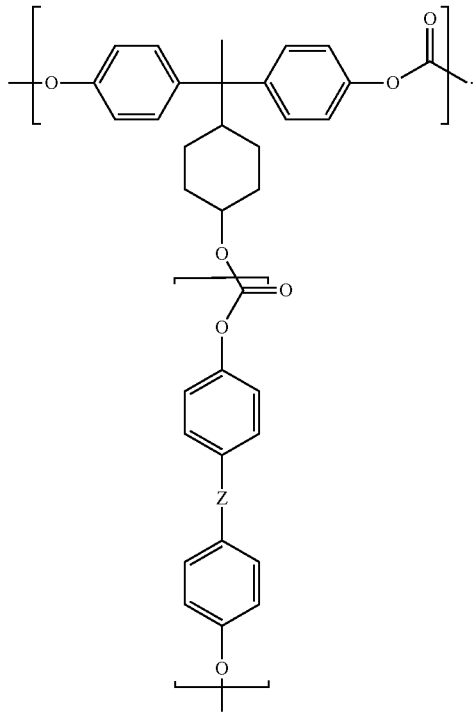

7. The polycarbonate resin composition of claim 1, wherein the linear polycarbonate resin is present in an amount of 50% by weight to 80% by weight and the branched polycarbonate resin is present in an amount of 20% by weight to 50% by weight, based on the total weight of the linear polycarbonate resin and the branched polycarbonate resin.

8. The polycarbonate resin composition of claim 1, wherein the fluorinated sulfonate-based metal salt is one or more metal salts selected from the group consisting of sodium trifluoromethyl sulfonate, sodium perfluoroethyl sulfonate, sodium perfluorobutyl sulfonate, sodium perfluoroheptyl sulfonate, sodium perfluorooctyl sulfonate, potassium perfluorobutyl sulfonate, potassium perfluorohexyl sulfonate, potassium perfluorooctyl sulfonate, calcium perfluoromethane sulfonate, rubidium perfluorobutyl sulfonate, rubidium perfluorohexyl sulfonate, cesium trifluoromethyl sulfonate, cesium perfluoroethyl sulfonate, cesium perfluorohexyl sulfonate, and cesium perfluorooctyl sulfonate.

9. The polycarbonate resin composition of claim 1, wherein the phenyl methyl silicone oil of Chemical Formula 3 has a structure of the following Chemical Formula 3-1:

Chemical Formula 3-1

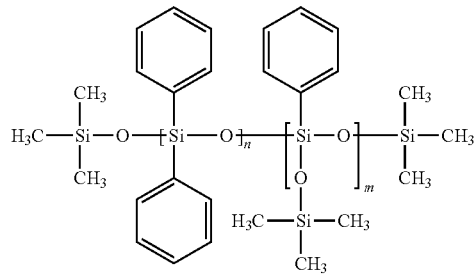

wherein in Chemical Formula 3-1:
n is an integer from 0 to 10; and
m is an integer from 1 to 10.

10. The polycarbonate resin composition of claim 1, wherein the phenyl methyl silicone resin is a network structured polyorganosiloxane resin including phenyl and methyl substituents in a solid-phase.

11. The polycarbonate resin composition of claim 1, further comprising, based on 100 parts by weight of the total weight of the linear polycarbonate resin and the branched polycarbonate resin:
(f) 0.05 parts by weight to 0.2 parts by weight of an epoxy-based hydrolysis-resistant agent; and
(g) 0.1 part by weight to 0.5 parts by weight of a UV absorber.

12. The polycarbonate resin composition of claim 11, wherein the epoxy-based hydrolysis-resistant agent includes a structure in which an epoxy group is fused into an aliphatic ring.

13. The polycarbonate resin composition of claim 11, wherein the UV absorber is one or more compounds selected from the group consisting of a benzotriazole compound, a benzophenone compound, an oxanilide compound, a benzoic acid ester compound, and a triazine compound.

14. The polycarbonate resin composition of claim 1, wherein the polycarbonate resin composition has a flame retardancy grade of V-0, as measured for a specimen having a thickness of 1.5 mm in accordance with UL 94 standard.

15. The polycarbonate resin composition of claim 1, wherein the polycarbonate resin composition has a spiral length of 50 cm or more, as measured by injection-molding at 330° C. using a spiral mold having a thickness of 2.5 mm and a width of 10 mm.

16. The polycarbonate resin composition of claim 1, wherein the polycarbonate resin composition has a melt index (MI) of 7 g/10 min to 50 g/10 min, as measured in accordance with ASTM D1238 (at 300° C. and a load of 1.2 kg for 10 minutes).

17. The polycarbonate resin composition of claim 1, wherein the polycarbonate resin composition has a number of drips of 0, as measured under UL94 vertical test conditions.

18. The polycarbonate resin composition of claim 1, wherein the polycarbonate resin composition has a total combustion time of 50 seconds or less, as measured under UL94 vertical test conditions.

19. A molded article, comprising the polycarbonate resin composition of claim 1.

* * * * *